(12) United States Patent
Trojanowski, Jr.

(10) Patent No.: US 12,275,092 B2
(45) Date of Patent: Apr. 15, 2025

(54) LASER CUTTING SYSTEMS AND METHODS

(71) Applicants: GESTAMP NORTH AMERICA, INC., Troy, MI (US); AUTOTECH ENGINEERING S.L., Amorebieta-Etxano (ES)

(72) Inventor: James Joseph Trojanowski, Jr., Troy, MI (US)

(73) Assignees: GESTAMP MASON, LLC, Wilmington, DE (US); AUTOTECH ENGINEERING S.L., Amorebieta-Etxano (ES)

( * ) Notice: Subject to any disclaimer, the term of this patent is extended or adjusted under 35 U.S.C. 154(b) by 1038 days.

(21) Appl. No.: 17/052,793

(22) PCT Filed: May 14, 2019

(86) PCT No.: PCT/US2019/032277
§ 371 (c)(1),
(2) Date: Nov. 3, 2020

(87) PCT Pub. No.: WO2019/222256
PCT Pub. Date: Nov. 21, 2019

(65) Prior Publication Data
US 2021/0362278 A1  Nov. 25, 2021

Related U.S. Application Data

(60) Provisional application No. 62/671,781, filed on May 15, 2018.

(51) Int. Cl.
*B23K 28/02* (2014.01)
*B21D 35/00* (2006.01)
(Continued)

(52) U.S. Cl.
CPC ............ *B23K 28/02* (2013.01); *B21D 35/002* (2013.01); *B23K 26/0093* (2013.01);
(Continued)

(58) Field of Classification Search
CPC .. B23K 26/16; B23K 26/0093; B23K 26/388; B23K 26/40; B23K 26/38; B23K 28/02;
(Continued)

(56) References Cited

U.S. PATENT DOCUMENTS

| | | | |
|---|---|---|---|
| 5,223,692 A | 6/1993 | Lozier et al. | |
| 5,380,978 A * | 1/1995 | Pryor | B23K 26/0846 |
| | | | 219/121.79 |

(Continued)

FOREIGN PATENT DOCUMENTS

| | | |
|---|---|---|
| CN | 102105256 A | 6/2011 |
| CN | 103624487 A | 3/2014 |

(Continued)

OTHER PUBLICATIONS

Office Action dated Oct. 11, 2022 for Russian Patent Application No. 2020137789; with English translation, 11 pages.

(Continued)

*Primary Examiner* — Jeffrey T Carley
*Assistant Examiner* — Alba T Rosario-Aponte
(74) *Attorney, Agent, or Firm* — Squire Patton Boggs (US) LLP

(57) ABSTRACT

Methods and systems for laser cutting of components are disclosed herein. Examples are specifically suited for laser cutting relatively large components of e.g. a vehicle framework such as a unitary side panel of a vehicle door. Multiple robots may perform laser cutting operations substantially simultaneously.

8 Claims, 4 Drawing Sheets

(51) Int. Cl.
   *B23K 26/00* (2014.01)
   *B23K 26/08* (2014.01)
   *B23K 26/16* (2006.01)
   *B23K 26/388* (2014.01)
   *B23K 26/40* (2014.01)
   *B23K 37/047* (2006.01)
   *B23K 101/00* (2006.01)
   *B23K 101/18* (2006.01)
   *B23K 103/04* (2006.01)

(52) U.S. Cl.
   CPC .......... *B23K 26/0884* (2013.01); *B23K 26/16* (2013.01); *B23K 26/388* (2013.01); *B23K 26/40* (2013.01); *B23K 37/047* (2013.01); *B23K 2101/006* (2018.08); *B23K 2101/185* (2018.08); *B23K 2103/04* (2018.08)

(58) Field of Classification Search
   CPC .............. B23K 37/047; B23K 2103/04; B23K 2101/006; B21D 35/002
   USPC ........................................ 219/121.72, 121.67
   See application file for complete search history.

(56) References Cited

U.S. PATENT DOCUMENTS

| | | | |
|---|---|---|---|
| 9,815,104 B2 | 11/2017 | Jin et al. | |
| 10,213,876 B2 | 2/2019 | Potocki et al. | |
| 2016/0030995 A1* | 2/2016 | Jin | B21D 43/18 72/39 |
| 2016/0263706 A1* | 9/2016 | Potocki | B23K 26/083 |
| 2017/0203388 A1* | 7/2017 | Matsuoka | B23K 26/064 |

FOREIGN PATENT DOCUMENTS

| | | | |
|---|---|---|---|
| CN | 103600173 B | 12/2015 | |
| CN | 105722634 A | 6/2016 | |
| DE | 102013210878 A1 * | 12/2014 | ............ B21D 35/00 |
| DE | 102016112231 A1 * | 1/2018 | |
| EP | 3141332 A1 | 3/2017 | |
| RU | 02100168 C1 | 12/1997 | |
| RU | 2351727 C2 | 4/2009 | |
| RU | 2360758 C1 | 7/2009 | |
| RU | 2470769 C1 | 12/2012 | |
| RU | 133241 U1 | 10/2013 | |
| RU | 2500514 C2 | 12/2013 | |
| RU | 2591106 C2 | 7/2016 | |
| WO | WO 2014/177034 A1 | 11/2014 | |
| WO | WO-2014198458 A1 * | 12/2014 | ............ B21D 35/00 |
| WO | WO 2015/073356 A1 | 5/2015 | |

OTHER PUBLICATIONS

First Office Action dated Jul. 6, 2022 for Chinese Patent Application No. 201980032237.9; with English translation, 25 pages.

International Search Report mailed on Sep. 24, 2019 for PCT Application No. PCT/US2019/032277, 6 pages.

Written Opinion of the International Searching Authority mailed on Sep. 24, 2019 for PCT Application No. PCT/US2019/032277, 9 pages.

* cited by examiner

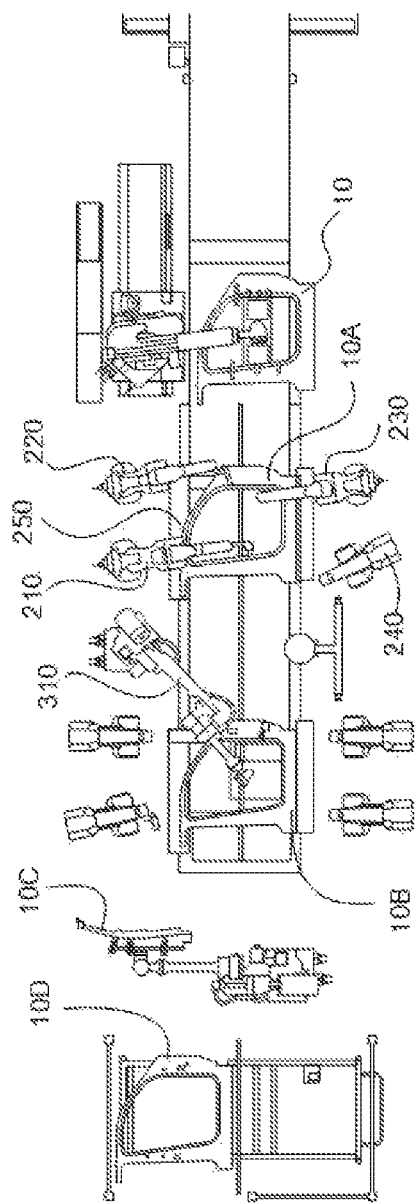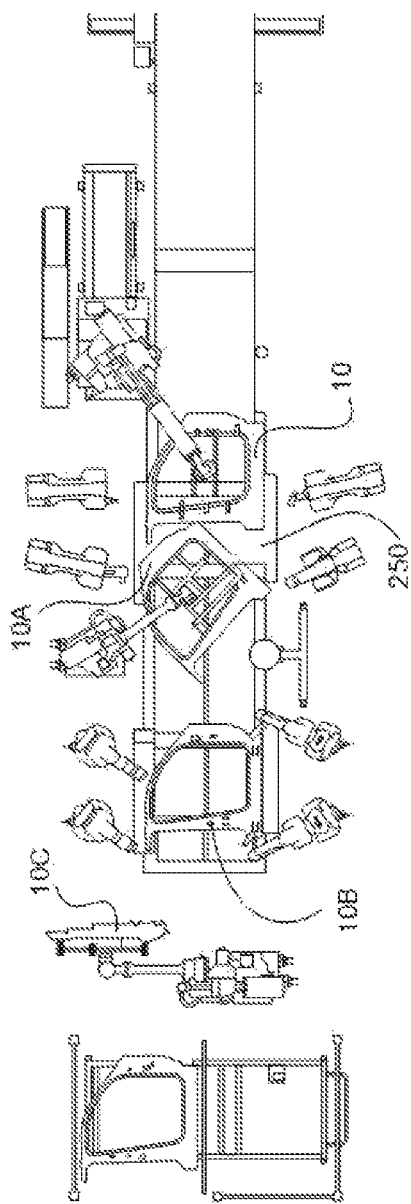

LASER CUTTING SYSTEMS AND METHODS

CROSS-REFERENCE TO RELATED APPLICATIONS

The present application is a National Stage filing under 35 U.S.C. § 371 of International Patent Application No. PCT/US2019/032277, filed May 14, 2019 and entitled "LASER CUTTING SYSTEMS AND METHODS," which claims the benefit and priority of U.S. Provisional Application No. 62/671,781, filed on May 15, 2018, both applications of which are herein incorporated by reference in their entirety for all purposes.

The present disclosure relates to laser cutting systems for cutting structural components for vehicles and methods of manufacturing structural components for vehicles.

BACKGROUND

Vehicles such as cars incorporate a structural skeleton designed to withstand all loads that the vehicle may be subjected to during its lifetime. The structural skeleton is further designed to withstand and absorb impacts, in case of e.g. collisions with other cars or obstacles.

The structural skeleton of a vehicle, e.g. a car, in this sense may include e.g. bumpers, pillars (A-pillar, B-pillar, C-pillar, D-pillar), side impact beams, rockers or sills, hinge pillars and shock absorbers. A side panel for a door frame generally comprises a rocker panel, a hinge pillar, an A-pillar and a B-pillar. The side panel may further comprise a C-pillar and a D-pillar.

In some examples, the side panel may be formed by connecting the lower part of a previously formed B-pillar to a previously formed rocker and its upper part to a previously formed A-pillar; and the lower part of a previously formed hinge pillar to the rocker and its upper part to the A-pillar.

Such structural members may be formed by joining one or more plates. For instance, a B-pillar may be formed by a central reinforcement B-pillar, an inner plate and in some examples an outer plate. The central reinforcement, the inner plate and the outer plate may be joined at their side flanges. The B-pillar, A-pillar, and other structural members may be supplied, e.g. by a single or different suppliers, to the vehicle manufacturer for joining them to form the side panel.

In other examples, the side panel or other relatively large structural components may be made as a unitary structure and then be supplied to the vehicle manufacturer. According to this aspect, the side panel or the large structural components may be formed by joining different blanks, e.g. by welding, for forming a composite blank and then shaping the composite blank, e.g. by hot forming or cold forming. Welding different blanks to form a composite blank and then shaping these composite blank is commonly called as Tailor Welded Blank (TWB). Blanks of different thicknesses, size or properties may be joined to form the composite blank for minimizing the weight of components while respecting structural requirements. These blanks are welded "edge to edge" ("butt-joining"). Another possibility is to use a Tailor Rolled Blank (TRB). However, the TRB technology implies an increased material consumption.

These so-called tailored blanks are generally designed to be hot stamped and afterwards be manufactured to form automotive parts, e.g. side panels or other structural components. Hot Forming Die Quenching (HFDQ) uses boron steel sheets to create stamped components with Ultra High Strength Steel (UHSS) properties, with tensile strengths of at least 1.000 MPa, preferably approximately 1.500 MPa or up to 2.000 MPa or more.

An example of steel used in hot-stamping processes is 22MnB5 steel. 22MnB5 steel is supplied in a ferritic-perlitic phase. The mechanical properties are related to this microstructure. After heating, the blank is hot formed, and may then subsequently be quenched. This process is known as press-hardening. With such a process, a predominantly martensite microstructure may be created. As a result, ultimate tensile strength and yield strength increase noticeably.

Usibor® 1500P is an example of a 22MnB5 steel. The composition of Usibor is summarized below in weight percentages (rest is iron (Fe) and unavoidable impurities):

| C | Si | Mn | P | S | Cr | Ti | B | N |
|---|---|---|---|---|---|---|---|---|
| 0.24 | 0.27 | 1.14 | 0.015 | 0.001 | 0.17 | 0.036 | 0.003 | 0.004 |

Usibor® 1500P may have a yield strength of e.g. 1.100 MPa, and an ultimate tensile strength of 1.500 MPa.

Usibor® 2000 is another boron steel with even higher strength. The yield strength of Usibor® 2000 may be 1.400 MPa or more, and the ultimate tensile strength may be above 1.800 MPa. A composition of Usibor® 2000 includes a maximum of 0.37%, a maximum of manganese of 1.4%, a maximum of 0.7% silicon and a maximum of 0.005% of boron.

Various other steel compositions of UHSS may also be used in the automotive industry. Particularly, the steel compositions described in EP2735620A1 may be considered suitable. Specific reference may be had to table 1 and paragraphs 0016-0021 of EP2735620A1, and to the considerations of paragraphs 0067-0079.

In some examples, the UHSS blanks may contain approximately 0.22% C, 1.2% Si, and 2.2 Mn.

Another material used in hot stamping is Ductibor® 500P. Ductibor® is a steel with much higher ductility and these can be effective for absorbing energy during an impact. The yield strength of Ductibor® 500 may be 350 MPa or more, and the ultimate tensile strength of 460 MPa or more.

The composition of Ductibor® 500 includes a maximum of 0.11% carbon, a maximum of 1.1% of manganese, a maximum of 0.06% silicon and a maximum of 0.001% of boron. Similar to Usibor®, Ductibor® may also be provided with a protective coating.

After deforming the composite blank to form the unitary structural component, e.g. a unitary side panel, some areas of the unitary structural component may need to be trimmed or cut and/or some holes may need to be drilled. As the unitary structural component has a high strength, laser cutting may be used for trimming side edges for better dimensional accuracy. Laser cutting may also be used for cutting a plurality of holes which may be provided for different purposes.

Hot formed components are generally cut and/or trimmed in laser cells. Laser cells usually comprise a laser cutting head mounted on a multi-axis robot and a holding system for holding the hot formed component while it is being cut. Laser cells may additionally comprise a housing for enclosing the robot and the holding table and protecting the working area. Laser cutting a part of component is relatively long process. In order to assure a high quality product, cutting speed is relatively low.

In order to slightly speed up the process, a rotatable holding system comprising two holding tables may be provided. While the first holding table may hold a first component that is being cut by the laser in a cutting position, the second holding table may be positioned in a charging position for receiving a second component. Components may be loaded and unloaded manually.

After cutting the first component, the holding system can rotate and the first holding table may be rotated to the charging position for discharging the first component while the second component is in the cutting position for being cut by the laser cutting. While the laser is cutting the second component held in the second holding table, the first component is discharged, e.g. placed in a transporting rack, and a further component is charged to the first rotary holding table. However, such a holding system may only reduce the charging and discharging time but the laser time is still not reduced.

An example of such a laser cell system is the TruLasercell 8030, as commercially available from Trumpf®.

Productivity of hot forming processes has increased in recent years. Multi-stage presses and/or presses with parallel dies for forming at least two components at the same time have contributed to increasing the number of components that can be formed per hour. However, current laser cells require a long time for cutting and/or trimming all these formed components. The productivity of hot forming is higher than the productivity of the current lasers. In some cases, the productivity of the hot formed components may be reduced in order to match the two production rates. In other cases, additional laser cells may be required. However, these additional laser cells require a relatively large area of the manufacturing plant which may not be always available. In addition, having several laser cells for cutting the formed components increases the logistics inside the manufacturing plant. For this reason, more personnel and storing areas may be required.

Furthermore, in those cases wherein the formed component is relatively large, e.g. a side panel for a door frame or ring, with long cutting lines, the cutting time is increased. The ratio between the forming time and the cutting time of component is therefore increased, so that more laser cells, personnel and storing areas are additionally required. Moreover, in order to reach all cutting lines of the large components robot's arms have to be longer and the holding table have to be larger. Consequently, laser cells have to be bigger and therefore more area of the manufacturing plant is necessary.

Throughout the present description and claims, the term "cutting" is to be understood as any operation to remove a portion of the steel component or to make an opening or incision in this steel component. Trimming is an example of cutting as an excess of material is removed from the steel component, the excess of material may commonly be the contour or a portion of the contour. Making openings such as rectangular holes or elongated holes or circumferentially holes are also examples of cutting.

The present disclosure provides examples of systems and methods that at least partially resolve some of the aforementioned disadvantages.

SUMMARY

In a first aspect, a method for cutting a component of a vehicle is provided. The method comprises charging the component from a charging area to a first laser station comprising a first fixture and a plurality of multi-axis robots with a laser cutting head; cutting a first plurality of areas of the component with the plurality of laser cutting heads while the component is positioned on the first fixture of the first laser station; transporting the component from the first laser station to a second laser station comprising a second fixture and a plurality of multi-axis robots including a laser cutting head; cutting a second plurality of areas of the steel component with the plurality of second laser cutting heads while the steel component is positioned on the second fixture; and discharging the component from the second laser station to a discharging area.

According to this aspect, the time of cutting, e.g. trimming and/or making apertures, a component may be reduced since a plurality of laser cutting heads may work at the same time in each of the laser stations. The productivity is therefore increased. In addition, as different multi-axis robots are mounted in each of the stations, the area of the manufacturing plant required for performing cutting operations is drastically reduced compared to solutions involving the use of several known laser cells.

The component herein may be a steel component and/or may be a vehicle component, specifically a component of a vehicle framework.

In some examples, cutting a first and/or second plurality of areas of the component may comprise trimming the component or making apertures, e.g. holes. In some of these examples, wherein cutting a first plurality of areas of the component comprises making at least one aperture, the method may further comprise trepanning the at least one aperture. The cut surface of the aperture may therefore be more precisely finished. In some examples, trepanning the at least one aperture may be made during transporting the component from the first station to the second station. A laser trepanning tool mounted on a robot may be used for trepanning the at least one aperture.

In some examples, the method may comprise inspecting the component, e.g. the areas of the component which have been previously cut, after cutting the first and/or the second plurality of areas of the steel component. The quality of the component may thus be increased. In some examples, discharging the component from the second laser station to the discharging area can include inspecting the component. In addition or alternatively, inspecting the component may be performed during transporting the component from the first to the second laser cutting station. In some of these examples, inspecting the component may comprise visual inspection. For example, a camera with suitable image processing software may be used for determining if all dimensional tolerances are met. Alternatively, other inspection methods relying e.g. on ultrasound may be used.

Charging the steel component, i.e. transporting the component to the laser station from a charging area to a first laser station may comprises using a gripper mounted on a multi-axis robot for gripping the component. The components may be supplied to the charging area in racks and the gripper may lift and hold the component in different positions. The gripper may comprise gripping elements arranged on a frame. The gripping elements may be for example suction cups or clamping devices. The multi-axis robot allows the gripper to move in different directions.

Additionally or alternatively, transporting the steel component from the first to the second laser cutting station and/or discharging the component from the second laser station to the discharging area may comprise using a gripper mounted on a multi-axis robot. The gripper may be according to any of the examples herein disclosed. Logistics and personnel necessary for controlling the process and for loading and/or unloading the components may be reduced if grippers mounted on robots can be used, rather than manual loading and unloading. Consequently, manufacturing costs may be reduced.

In some examples, multi-axis robots of the first laser station may be arranged on opposite sides of the fixture. Alternatively or additionally, the multi-axis robots of the second laser station may be arranged at the opposite sides of the holding system. For example, the opposite robots may be arranged transversal to working direction, i.e. from the charging area to the discharging area. According to these aspects, the potential area of the component covered by the laser cutting head mounted on each of the robots oppositely arranged may be reduced. Movements of the arms of the robots may thus be reduced. As result, cutting precision may be increased and positioning times of the cutting head may be reduced. Moreover, as the arms may be shorter, the space required for these robots may be reduced.

In some examples, the first laser station and/or the second laser station may comprise four laser cutting heads mounted on four multi-axis robots. Such multi-axis robots may be substantially arranged on the corners of the fixture of each station. Providing four laser cutting heads mounted on four robots, the time required for performing cutting operations in the steel component may be reduced. The cutting productivity may thus be increased. Consequently, the output of steel components by the forming tool, e.g. a hot forming tool, may have the same production speed as the steel components delivered to the first cutting station. Manufacturing costs may be reduced accordingly.

According to these aspects, the area covered by each of the laser heads may also be reduced and the length of arms may be reduced. Movements of the arms may be shorter and more repetitive. For this reason, the required space of the manufacturing plant may still be reduced.

In some examples, the fixture of the laser stations may comprise a base and clamping devices for holding the component in place while some parts are cut. The base may have a shape that corresponds with the steel component.

In some examples, the component may be a steel component and specifically a hot formed component. The hot formed component may be made from boron steel, and more optionally made from 22MnB5. The component may comprise an aluminum silicon coating or a zinc coating.

Alternatively, the steel component may be a cold formed component. High strength steels or ultra high strength steels may be used for forming the component by cold forming.

In some examples, the component may be a structural steel component of a vehicle. For example, the component may be a B-pillar, an A-pillar, a rocker, a hinge pillar or side beam. In other examples component may be a side panel for a door frame of a vehicle.

In a further aspect, a method for manufacturing a unitary panel for a door frame of a vehicle is provided. The method comprises providing a plurality of blanks; joining the blanks to each other to form a composite blank; deforming the composite blank to form the unitary side panel; placing the unitary side panel in a first laser station comprising a first fixture and a plurality of laser cutting heads mounted on a plurality of multi-axis robots; cutting a first plurality of areas of the unitary side panel with the plurality of laser cutting heads while the unitary side panel is held in the fixture of the first laser station; transporting the unitary side panel from the first laser station to a second laser station comprising a second fixture and a plurality of laser cutting heads mounted on a plurality of multi-axis robots; cutting a second plurality of areas of the unitary side panel with the plurality of laser cutting heads while the steel component is held in the second fixture of the second laser station.

According to this aspect, large structural components as a unitary side panel for a door frame may be more efficiently manufactured. Furthermore, as the unitary panel for a door frame is a large component, the production area when compared to known laser cutting cells is reduced as robot arms for these applications in the known solutions require a large free space in order to reach the whole side panel. As there is a plurality of robots in each station, the area to be covered by each of them is relatively small and therefore the required area for the movements of the robot's arms may thus be reduced.

In some examples, cutting a first and/or second plurality of areas of the unitary side panel may comprise trimming the unitary side panel or making apertures, e.g. holes. In some of these examples, wherein cutting a first plurality of areas of the side panel comprises making at least one aperture, the method may further comprise trepanning the at least one aperture. The cut surface of the aperture may therefore be more precisely finished. In some examples, trepanning the at least one aperture may be done during transporting the side panel from the first station to the second station. A laser trepanning tool mounted on a robot may be used for trepanning the at least one aperture.

In some examples, the method for manufacturing a unitary side panel may further comprise discharging the unitary side panel from the second laser station to a discharging area.

Additionally or alternatively, transporting the unitary side component from the first to the second laser cutting station and/or discharging the steel component from the second laser station to the discharging area may be according to any of the examples herein disclosed.

As with respect to the method for cutting a steel component, at least two of the plurality of multi-axis robots of the first laser station and/or of the second laser station may be arranged at the opposite sides of the fixture.

In some examples, the first laser station and/or the second laser station may comprise four laser cutting heads mounted on four multi-axis robots. As a result, the multi-axis robots may be arranged on the corners of the fixture of each station.

In this disclosure, the rocker, the B-pillar, the A-pillar and the hinge pillar should be understood as follows. A rocker or a sill is the component arranged in substantially horizontal direction which extends below the door opening(s) from the rear to the front part of a vehicle. A B-pillar is the vertically arranged component which extends from the floor to the roof of a vehicle. B-pillars are arranged in the central area of the vehicle and generally separate the front door opening and the rear door opening. A hinge pillar is a vertical body which substantially extends from the floor to the engine hood or the windscreen of a vehicle. Hinges of the front doors are commonly mounted on the hinge pillars. An A-pillar is the arcuate body that extends substantially parallel to a portion of the roof panel and to a portion of the front windscreen in the upper area of the door opening. The A-pillar extends form the upper part of the B-pillar to the upper part of the hinge pillar. The B-pillar, the A-pillar, the hinge pillar and the rocker define a door frame.

When a side panel is formed as a unitary structure, the boundaries between different pillars are less clear, precisely because it is a single structure. Therefore reference is made to B-pillar "portions", A-pillar "portions" etc.

A transition between the B-pillar portion and the rocker portion is the area wherein the B-pillar portion meets the rocker portion, or in other words, the area changing from a substantially horizontally arranged body to a substantially vertical body. A transition between the A-pillar and the B-pillar portions, a transition between the A-pillar and the hinge pillar portions and a transition between the hinge pillar and the rocker portions may similarly be defined.

In some the examples, the unitary side panel may include a rocker portion, an A-pillar portion, a hinge pillar portion connecting the rocker portion to the A-pillar portion; and a B-pillar portion connecting the rocker portion to the A-pillar portion. In these examples, each of the four laser cutting heads may be configured to perform cutting operations in one of the transitions between the rocker portion and a pillar portion and between the pillar portions of the unitary panel, i.e. in the transitions rocker portion—B-pillar portion, B-pillar portion—A-pillar portion, A-pillar portion—hinge pillar portion and hinge pillar portion—rocker portion.

In some of these examples, each of the multi-axis robots having a laser cutting head may be substantially arranged at one of the transitions between the rocker portion and a pillar portion and between the pillar portions of the unitary side panel when the unitary side panel is held by the support system of the first laser station and/or the second laser station.

According to these aspects, each laser cutting head may have a relatively small area for performing cutting operations. The overall cutting length performed by each of the laser cutting heads may thus be reduced. As a result, the cutting productivity may be increased and the hot forming and cutting may accordingly be synchronized (in the sense that they have the same productivity), even in those cases wherein two side panels may be hot formed at the same time in a single press.

In some cases, deforming the composite blank to form the unitary side panel may comprise hot forming the composite blank. Two composite blanks may be formed at the same time, e.g. one blank to form the left side unitary panel, and one blank to form the right side unitary panel. In some examples, the press systems may comprise two forming dies. Hot forming productivity is consequently doubled. These two composite blanks may be formed in a single stroke so that a unitary side panel for a right side door and for a left side door are formed at the same time in a single hot forming press.

At least some of the blanks that form the composite blank may be made from boron steel, e.g. 22MnB5. At least one of the boron steel blanks may comprise an aluminium alloy coating or a zinc alloy coating.

Alternatively, the composite blank may be deformed by cold forming. High strength steels or ultra high strength steels may be used for forming the unitary side panel by cold forming.

The plurality of blanks that form the composite may comprise different material and/or thicknesses. For example, blanks of Usibor® and blanks or parts of the blanks of Ductibor® may be used. Using these types of materials in hot forming processes leads to a predominantly martensitic structure in the Usibor® parts and a predominantly ferritic-perlitic structure in the Ductibor® parts. According to these aspects, the properties of the unitary side panel may be tailored.

Joining the blanks to each other to form a composite blank may comprise laser welding the blanks to each other. Laser welding blanks may involve ablating the coating, i.e. removing the coating, of the area to be welded and then laser welding. In other examples, laser welding blanks may involve adding to the weld zone a filler, e.g. in the form of a powder or of a wire. Such a filler may have a composition suitable of counteract the negative effect of the coating.

In a further aspect, a unitary panel as obtained by a method according to any of the examples herein described is provided.

In some examples, the unitary panel may comprise areas with different tensile strength according to any of the examples herein described. In some of these examples, the areas with different tensile strength may have a different microstructure.

In some examples, at least one of the blanks may comprise areas with different tensile strength. A blank may be composed by two different materials having different tensile strength. The ductility of the areas with lower tensile strength is accordingly higher and therefore the energy absorption in a crash may be increased.

Alternatively, these areas with different tensile strength may have a different microstructure. In hot formed unitary side panels of a different microstructure may be created by controlling the cooling of a previously heated composite blank to a temperature above the austenitization temperature in a press during shaping the composite blank to form a side panel. The cooling of different areas of the composite blank may be controlled by providing zones of the forming tool with heaters. Accordingly, the unitary side panel comprises zones with a predominantly martensitic structure and zones comprising ferrite, perlite or bainite or a mixed of thereof. Alternatively, a different microstructure, may be created by partially heating a portion of the unitary side panel which has been press-hardened to change the predominantly martensitic structure to a structure containing ferrite and/or perlite and/or bainite and/or tempered martensite and a mixed of thereof. The tensile strength of the predominantly martensitic structure may be above 1400 MPa, and preferably above 1500 MPa, while the areas with a lower strength may have a tensile strength below 1000 MPa, preferably below 800 MPa, e.g. between 800 MPa and 500 MPa.

In a further aspect, a laser cutting system for cutting a component is provided, which comprises a first laser station comprising a first fixture and a plurality of multi-axis robots with a laser cutting heads. The multi-axis robots are configured to laser cut the component simultaneously while the component is positioned on the first fixture.

In a yet further aspect, a laser cutting system for cutting a component, e.g. a unitary side panel, is provided. The laser cutting system comprises a first laser station comprising a plurality of laser cutting heads mounted on a plurality of multi-axis robots and a fixture for holding the component; a second laser station comprising a plurality of laser cutting heads mounted on a plurality of multi-axis robots and a fixture holding the component; and a transporting system for transporting the component from the first laser station to the second laser station.

In some examples, the laser cutting system may comprise a housing for enclosing the first laser station, the second laser station and the transportation system.

The laser cutting system may comprise a charging area for storing components to be laser cut in the first laser cutting station and a discharging area for storing components after being 010-9133-3933/1/AMERICAS laser cut in the second laser cutting station. In some examples, the charging area and the discharging area may be arranged outside the housing. Alternatively, the charging area and/or the discharging may be arranged inside the housing.

In some examples, the laser cutting system may comprise a trepanning station arranged between the first and the second laser cutting stations.

The laser cutting system may comprise a system for removing scrap from the first and/or the second laser cutting station. The scrap removal system may automatically collect the scrap produced in each of the laser cutting stations. In some of these examples, the scrap removal system may comprise a scrap container and a conveyor system for conveying the scrap of the first and/or the second laser cutting station. Personnel may accordingly be reduced.

The laser cutting system may comprise an inspection station arranged between the first and the second laser cutting stations and/or between the second laser cutting station and the discharging area. The discharge station may comprise separate stacks for products having passed the quality inspection and products not having passed the quality inspection. After a predetermined number of components have been laser cut, a forklift may pick a stack for further processing.

In some examples, the transporting system may comprise a gripper for gripping the steel component mounted on a multi-axis robot.

The laser cutting system may comprise a charging system for transporting the component from the charging area to the first laser cutting station. In addition, the charging system may comprise a gripper for gripping the steel component mounted on a multi-axis robot.

The laser cutting system may comprise a discharging system for transporting the component from the second laser cutting station to the discharging area. The discharging system may comprise a gripper for gripping the steel component mounted on a multi-axis robot.

The gripper of the transporting system and/or of the charging system and/or of the discharging system may be according to any of the examples herein provided.

In some examples, the laser cutting system may comprise at least two of the plurality of multi-axis robots of the first laser station and/or of the second laser station arranged at the opposite sides of the fixture.

In some examples, the first laser station and/or the second laser station may comprise four laser cutting heads mounted on four multi-axis robots. As a result, the multi-axis robots may be arranged on the corners of the fixture of each station.

According to these aspects, each laser cutting head may have a relatively small area for performing cutting operations. The overall cutting length performed by each of the laser cutting heads may thus be reduced. As a result, the cutting productivity of the laser cutting system may be increased for a reduced area of the laser cutting area. The ratio between the number of components cut, e.g. unitary side panel, and the area occupied by the laser equipment is higher in any of the laser cutting systems according to the invention than in known laser cutting cells.

BRIEF DESCRIPTION OF THE DRAWINGS

Non-limiting examples of the present disclosure will be described in the following, with reference to the appended drawings, in which:

FIGS. 2 and 3 schematically illustrate different steps of an example of laser cutting method in the system of FIG. 1;

FIG. 4b is a flow diagram of the process illustrated in FIG. 4a; and

DETAILED DESCRIPTION OF EXAMPLES

In these figures the same reference signs have been used to designate matching elements.

Figure 1:
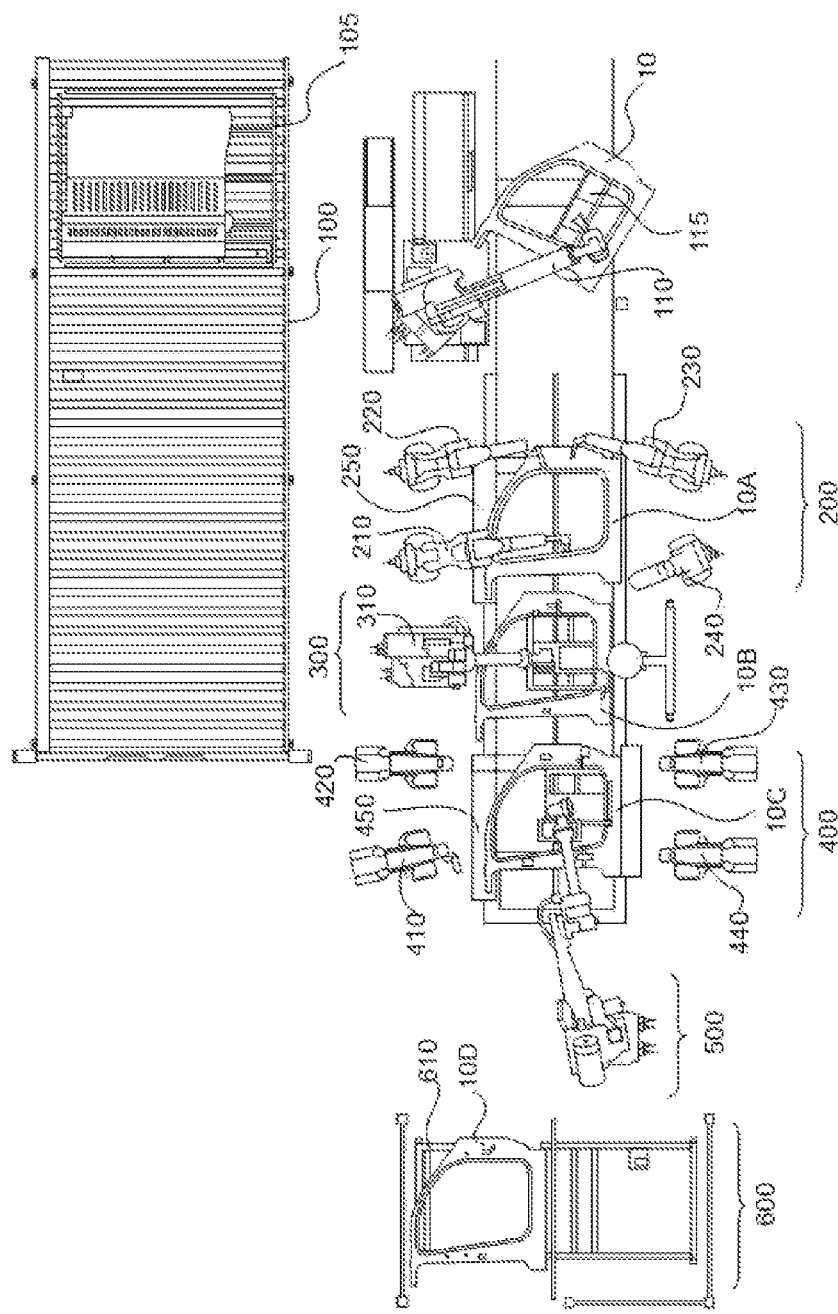
FIG. 1 schematically illustrates an example of a laser cutting system.

FIG. 1 schematically illustrates an example of a laser cutting system. The laser cutting system according to this example comprises a charging station 100, a first laser cutting station 200, a trepanning station 300, a second laser cutting station 400, a quality checking station 500, and a discharge area 600.

Components may arrive on a rack 105. Multiple components may be placed on each rack. The component 10 in this example is a unitary side panel, obtained after hot forming of a tailor welded boron steel blank. A robot 110 may pick the component 10 from the rack 105. To this end, the robot may have one or more grippers for picking and handling the component 10. In an example, the robot may have suction caps, grippers or magnets. The robot 110 may hold the component, while laser cutting actions are performed in the first laser cutting station 200 on a previous component 10A.

The first laser cutting station 200 may include a plurality of multi-axis robots and a first fixture 250. In this particular example, four robots 210, 220, 230 and 240 are shown. The robots 210-240 each have a laser cutting head and they may be programmed to substantially simultaneously perform several laser cutting actions on the component (in the shown instant, the component 10A). These laser cutting actions may include trimming side edges, and making holes.

Since multiple robots perform laser cutting actions, each of the robots only performs actions in an approximate quadrant of component 10A. I.e. robot 210 will predominantly focus on the top portion of the B-pillar, and the A-pillar, robot 220 predominantly on the A-pillar and the transition towards the hinge pillar, robot 230 predominantly on the hinge pillar and a portion of the rocker, whereas robot 240 will predominantly work on the bottom portion of the B-pillar and on a portion of the rocker.

None of the robots 210, 220, 230, 240 are required to linearly displace along the working direction (i.e. the direction of flow of the components from the charging area towards the discharging area).

Trepanning station 300 in this example may include a multi-axis robot 310 with e.g. suction naps to pick up a component after all cutting actions have been performed in the first laser cutting station 200. The robot 310 may handle the component and hold one or more of the previously cut holes in front of a fixed laser for trepanning. The robot 310 may further be programmed to hold the component (in this instance component 10B) until all necessary laser cutting actions have been performed on another component (in this case component 10C).

After trepanning, the component may be positioned on a second fixture 450 of a second laser cutting station 400. The second laser cutting station 400 may include multiple robots with a laser cutting head. In this particular example, the second laser cutting station 400 includes four multi-axis robots 410, 420, 430, and 440. Each of these multi-axis robots may perform laser cutting actions substantially simultaneously on different parts of component 10C as was previously explained with reference to the first laser cutting station 200.

The component may subsequently be picked-up by a multi-axis robot suitable for handling and a quality check may be performed at station 500. The quality check may include a variety of inspection techniques, in particular visual inspection techniques. I.e. in one example, a camera with suitable image processing software may be used for automated visual inspection.

Finally, the component (in this case component 10D) may be on a rack 610 in a discharge area 600. A forklift may be used to pick up one or more components for further processing and transportation.

FIGS. 2 and 3 schematically illustrate different steps of an example of laser cutting method in the system of FIG. 1;

In FIG. 2, component 10C has been picked up from second laser cutting station 400 and is undergoing a visual inspection. After removing component 10C from the second laser cutting station 400, robot 310 has position component 10B in the second laser cutting station. In the moment shown in FIG. 2, laser cutting actions are being finished on component 10A in the first laser cutting station.

In FIG. 3, component 10A is pickup for trepanning and (in some cases) a visual inspection at station 300. Substantially simultaneously component 100 is positioned on first fixture 250 for laser cutting in the first laser cutting station 200.

By including multiple laser cutting stations, and by including multiple robots with laser heads in each of the stations, the speed of processing can be increased to keep pace with the speed of the hot stamping process. In spite of having multiple robots, the cost can be much lower than when using traditional laser cells. Moreover, with the efficient arrangement on opposite sides of the fixtures, and due to the fact that each of the robots only covers a relatively small area, the footprint of the operation can be kept small.

In an industrial setting, left side components and right side components may be handled in parallel. E.g. one laser line according to the example of FIG. 1 may be configured to handle left side door panels and may run in parallel with another laser line configured for handling right side door panels.

Figure 4A:
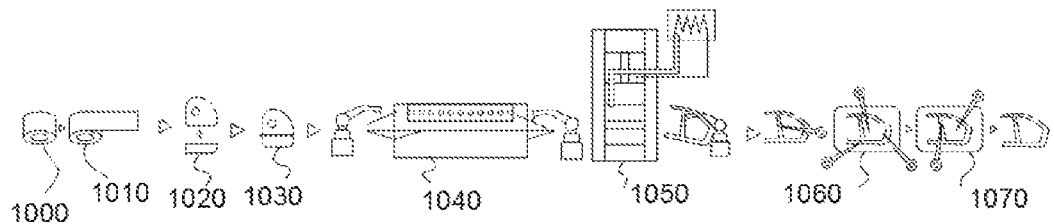
FIG. 4a schematically illustrates an example of a process involving hot stamping and laser cutting.
Figure 4B:
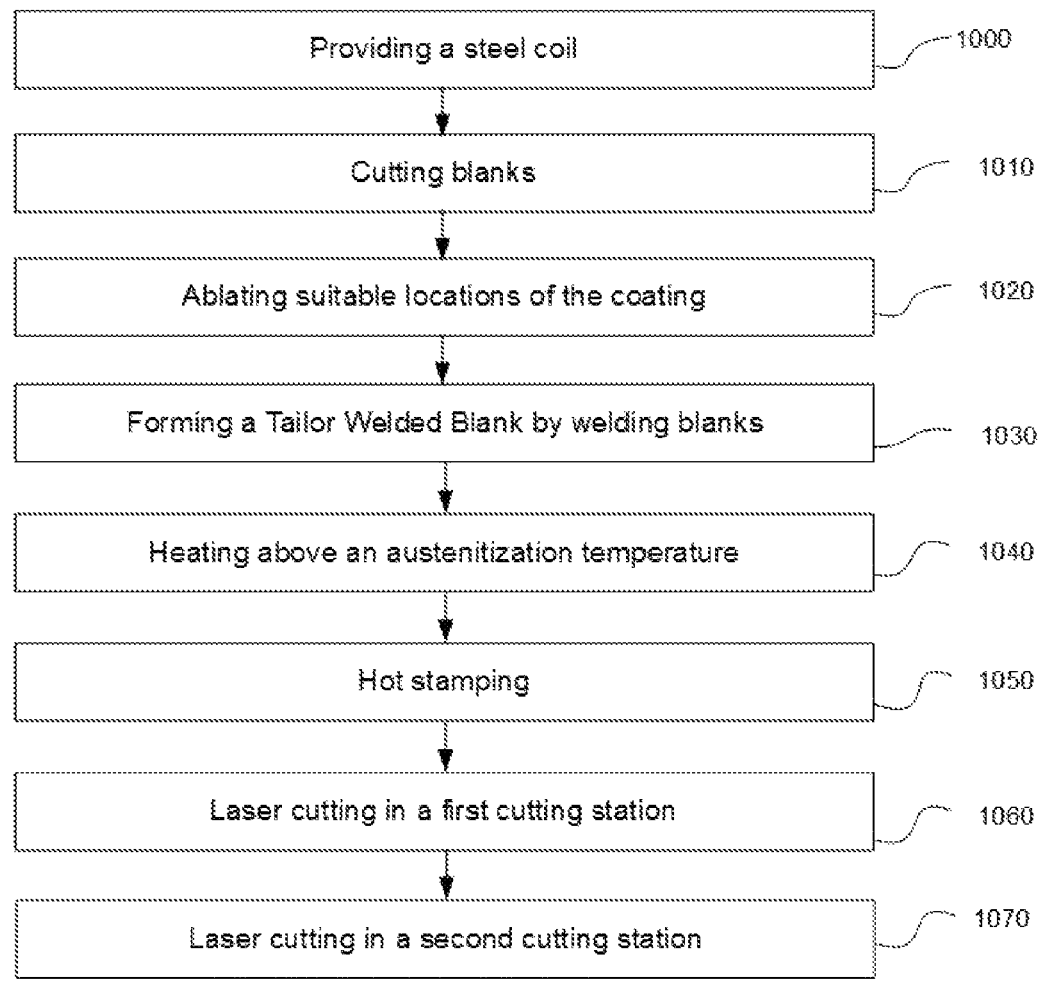

FIG. 4a and FIG. 4b schematically illustrates an example of a process chain. The process chain may start with a steel coil 1000. Ultra high strength steel may be used for the manufacture of high strength components such as e.g. a B-pillar, a rocker or a unitary side panel. One example of a suitable steel is 22MnB5, such as Usibor™. This steel may be provided with a protective coating, e.g. an aluminium-silicon coating or a zinc coating.

Blanks of suitable dimensions may be cut 1010. A Tailor Welded Blank may be formed by edge-to-edge welding of several blanks 1030. If a steel with an aluminium silicon coating is used, this coating may be ablated 1020 at suitable locations to avoid the presence of aluminium in the weld area because this could negatively affect the strength. In this particular example, a TWB is formed for the manufacture of a unitary side panel.

At oven 1040, the tailor welded blank may be heated to above an austenization temperature, in particular to above Ac3. After sufficient heating, a hot stamping process 1050 may be performed, optionally including tailored quenching/heating so as to obtain desirable microstructures in selected areas of the side panel. Additionally, or alternatively localized heating of selected areas may take place to tailor the microstructure and mechanical properties as desired.

At laser cutting stations 1060 and 1070, multiple laser heads may substantially simultaneously perform trimming and cutting operations on the component. The number of robots with laser heads in e.g. of the stations may vary between one and six, and more particularly between two and four. A suitable number of robots may depend on the dimensions of the component to be laser cut and on the number of operations that need to be performed. By changing the number of laser cutting stations, and by changing the number of robots per station, the speed of processing may be matched to the productivity of the hot stamping process.

Figure 5:
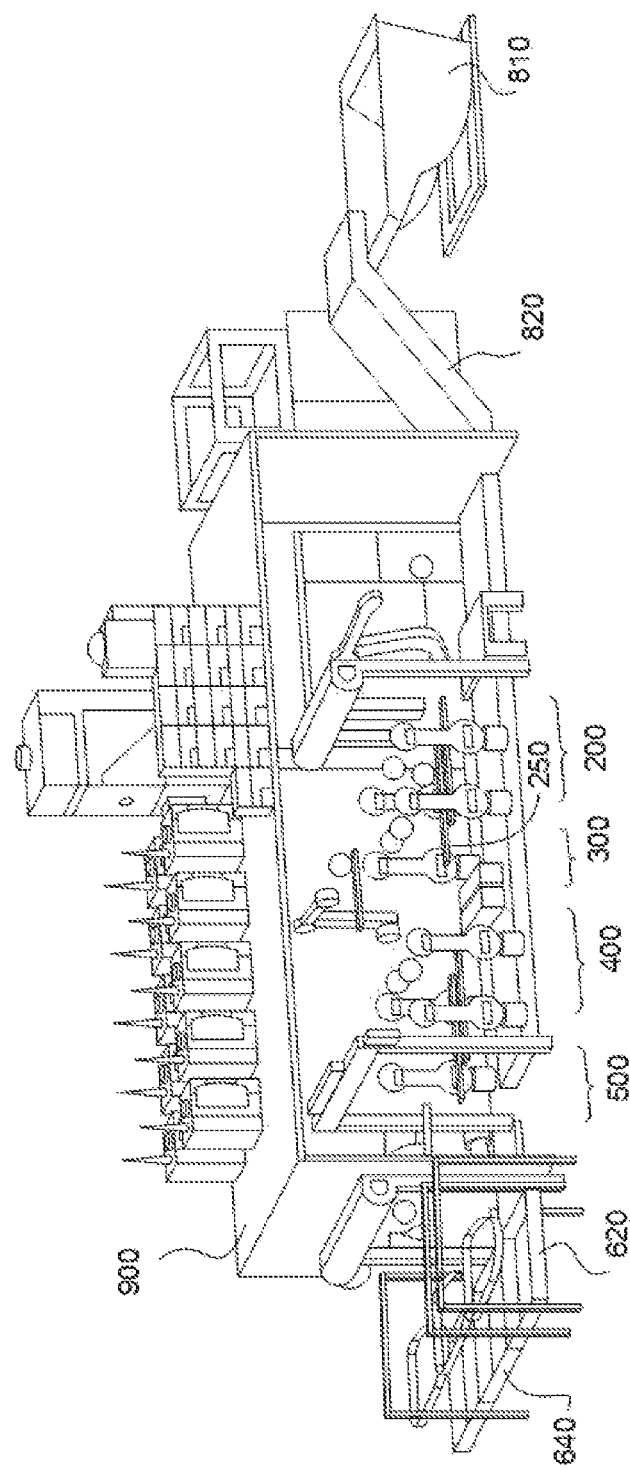
FIG. 5 schematically illustrates an example of a laser cutting system.

FIG. 5 schematically illustrates an example of a laser cutting system, which substantially corresponds to the examples described hereinbefore. The several cutting stations may be enclosed in a housing 900. Auxiliary systems for temperature control, ventilation, electrical power etc. may be arranged on top of housing 900.

A scrap removal system may be integrated in the laser cutting line as well. In this particular example, a scrap removal system 800 includes a scrap conveyor belt 820 which collects scrap from both the laser cutting stations 200 and 400 and moves in the opposite direction to the direction of the components. Scrap may be dropped in a scrap container 810.

In this example, at discharge 600, racks may be provided for stacking products in different piles 620 and 640. Multiple racks and piles might be used.

A robot as used herein is meant to denote an automatically controlled, reprogrammable, multipurpose, manipulator programmable in three or more axes, for use in industrial automation applications. Multi-axis robot is preferably to be interpreted as a five or six axis robot.

Each of the robots in the laser cutting line may be programmed to perform specific tasks. Coordination of the movements of the robots during their different tasks may be necessary so that accidents can be avoided, and the footprint of the laser cutting line may remain relatively small.

Although reference has been made particularly to unitary side panels, it should be clear that other components, specifically other structural vehicle components may be advantageously manufactures using examples of the methods and systems described herein. Specifically, relatively large structural components having a length or width exceeding 75 cm or 1 meter, and particularly having length and width exceeding these dimensions may be advantageously manufactured using examples of the methods and systems described herein.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A method for cutting a component comprising:
charging the component from a charging area to a first laser station, the first laser station comprising a first fixture, and a first plurality of multi-axis robots including first laser cutting heads, and wherein the first plurality of multi-axis robots are arranged on opposite sides of the first fixture;
cutting a first plurality of areas of the component simultaneously with the first laser cutting heads of the first plurality of multi-axis robots while the component is held in the first fixture; followed by
transporting the component from the first fixture of the first laser station to a second fixture of a second laser station using a gripper mounted on a multi-axis robot for gripping the component, the second laser station comprising the second fixture, and the second fixture being different from the first fixture, and a second plurality of multi-axis robots including second laser cutting heads different from the first laser cutting heads and the first plurality of multi-axis robots, and wherein the second plurality of multi-axis robots are arranged on opposite sides of the second fixture;

after transporting from the first fixture to the second fixture, the component from the first laser station to the second laser station, cutting a second plurality of areas of the component simultaneously with the second laser cutting heads of the second plurality of multi-axis robots while the component is positioned on the second fixture; and discharging the component from the second laser station to a discharging area.

2. The method according to claim 1, wherein cutting the first plurality of areas of the component comprises making at least one aperture and wherein the method further comprises trepanning the at least one aperture.

3. The method according to claim 2, wherein transporting the component from the first laser station to the second laser station comprises trepanning the at least one aperture.

4. The method according to claim 1, wherein the method comprises inspecting the component after cutting the first and/or the second plurality of areas of the component.

5. The method according to claim 4, wherein discharging the component from the second laser station to the discharging area comprises inspecting the component.

6. The method according to claim 1, wherein the first plurality of multi-axis robots comprises four multi-axis robots, each having one of the first laser cutting heads.

7. The method according to claim 1, wherein the component is a hot formed component made from boron steel.

8. The method according to claim 6, wherein the second plurality of multi-axis robots comprises four multi-axis robots, each having one of the second laser cutting heads.

* * * * *